United States Patent [19]

Lee

[11] 4,359,778
[45] Nov. 16, 1982

[54] CHANNEL EQUALIZER AND METHOD FOR CANCELLING GHOSTS

[75] Inventor: Ronald B. Lee, Skokie, Ill.

[73] Assignee: Zenith Radio Corporation, Glenview, Ill.

[21] Appl. No.: 231,713

[22] Filed: Feb. 5, 1981

[51] Int. Cl.³ .................... H03H 21/00; H04B 3/14
[52] U.S. Cl. .................... 375/13; 179/170.2;
333/18; 333/166; 358/167; 358/905; 364/825
[58] Field of Search .................... 375/12, 13; 358/36,
358/166, 167, 905; 179/170.2; 455/296, 65, 307;
333/166, 18; 364/724, 825; 328/167

[56] References Cited

U.S. PATENT DOCUMENTS

| | | | |
|---|---|---|---|
| 3,314,015 | 4/1967 | Simone | 375/13 |
| 3,829,798 | 8/1974 | Byram et al. | 333/166 |
| 4,057,696 | 11/1977 | Gitlin et al. | 179/170.2 |
| 4,091,418 | 5/1978 | Ciciora | 358/160 |
| 4,127,874 | 11/1978 | Iwasawa et al. | 358/167 |

FOREIGN PATENT DOCUMENTS 2016870 9/1979 United Kingdom .

OTHER PUBLICATIONS

"A Novel Automatic Ghost Canceller"—Makino et al.—IEEE Trans. on Consumer Electronics, vol. CE-26, No. 3, Aug. 1980, pp. 629-637.

*Primary Examiner*—Marc E. Bookbinder

[57] ABSTRACT

A channel equalizer and ghost cancelling technique are disclosed for removing ghosts from a communications signal which includes a training signal and data. The training signal and its ghosts are processed as a finite length sequence of numbers. The equalizer includes a chain of cascaded filters, the first of which receives the training signal and its ghosts for assuming a filter condition which reduces the finite sequence by two points at the filter's output. Each successive filter in the chain receives the output of an immediately preceding filter and assumes a filter condition in which an additional two points of the finite sequence are eliminated or forced to zero. The filter conditions assumed in response to the training signal and its ghosts are maintained while the data is applied to the filter chain so that ghosts of the type experienced by the training signal are removed from the data.

13 Claims, 14 Drawing Figures

$$\Delta R = \frac{\begin{vmatrix} -B_{N-1} & C_{N-3} \\ -B_N & C_{N-2} \end{vmatrix}}{\begin{vmatrix} C_{N-2} & C_{N-3} \\ C_{N-1} & C_{N-2} \end{vmatrix}}$$

$$\Delta S = \frac{\begin{vmatrix} C_{N-2} & -B_{N-1} \\ C_{N-1} & -B_N \end{vmatrix}}{\begin{vmatrix} C_{N-2} & C_{N-3} \\ C_{N-1} & C_{N-2} \end{vmatrix}}$$

$$\Delta R = \frac{B_N C_{N-3} - B_{N-1} C_{N-2}}{C_{N-2}^2 - C_{N-1} C_{N-3}}$$

$$\Delta S = \frac{B_{N-1} C_{N-1} - B_N C_{N-2}}{C_{N-2}^2 - C_{N-1} C_{N-3}}$$

CHANNEL EQUALIZER AND METHOD FOR CANCELLING GHOSTS

BACKGROUND OF THE INVENTION

This invention is directed to a channel equalizer and method for cancelling ghosts from a transmitted communication signal. A television signal is exemplary of the type of signal from which ghosts are cancelled by the present invention.

It is well known that many types of transmitted signals acquire ghosts on their way to a receiver. Signals which are broadcast over the air generally acquire ghosts as a result of the transmitted signal being reflected by a building or other object. Signals which are transmitted via cables can acquire ghosts due to reflections from improper terminations and other factors. Whatever the source of the ghosts, the signal picked up at the receiver is adversely affected.

In the television industry, various ghost cancelling proposals have been made. Some such proposals require the use of transversal filters in a so-called feed-forward network. Others require the use of complex filters in a network around which a feedback path is established. These and other such proposals either have not worked well, have been too complex, or both. In addition, some such proposals require circuitry which is not unconditionally stable. Hence, ghost cancelling circuits have not been included in commercial television receivers or in other high volume products.

OBJECTS OF THE INVENTION

Hence, it is a general object of the invention to provide an improved channel equalizer and method for cancelling ghosts from a transmitted signal.

It is a more specific object of the invention to provide a channel equalizer which substantially cancels ghosts, irrespective of their origin, and which is more easily stabilized.

It is another object of the invention to provide a channel equalizer for use in a television receiver.

BRIEF DESCRIPTION OF THE FIGURES

The objects stated above and other objects of the invention are set forth more particularly in the following detailed description and the accompanying drawings, of which.

DESCRIPTION OF THE PREFERRED EMBODIMENT

Before describing the illustrated embodiment of the invention, some preliminary comments regarding ghost cancellation will be made. In general, if the impulse response of a communication channel is known, a receiver having the inverse of that response will reproduce the transmitted impulse. Therefore, the problem of ghost cancellation or channel equalization can be reduced to finding the inverse of a finite length sequence which represents the impulse response of the communication channel. Any reflections associated with the response of the communications channel will be exactly compensated for by a receiver-based channel equalizer having the inverse response of the communications channel.

Figure 1:
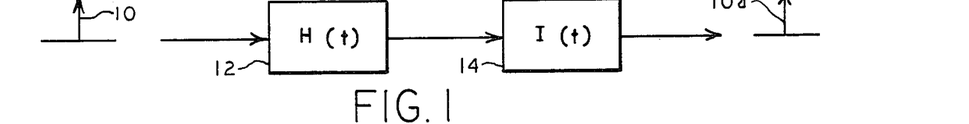
FIG. 1 is a general illustration of a communication system for use in explaining some preliminary concepts.

The theory stated above is shown graphically in FIG. 1. An impulse 10 is shown as being transmitted by a communications channel 12 having an unlimited bandwidth. The complete response of the channel 12 is identified as H(t). At a receiver, a channel equalizer 14 has a response I(t) which is the inverse of H(t). Accordingly, the output of the equalizer 14 is an impulse 10a which has the same characteristics as the impulse 10. Any ghosts introduced by the communication channel 12 are removed by the equalizer 14.

In practical communication systems, impulses are not transmitted because of bandwidth limitations. However, a training pulse or reference pulse may be transmitted. Such a training pulse may be a pulse which is transmitted on a non-active line during the vertical interval of a television transmission.

Figure 2:
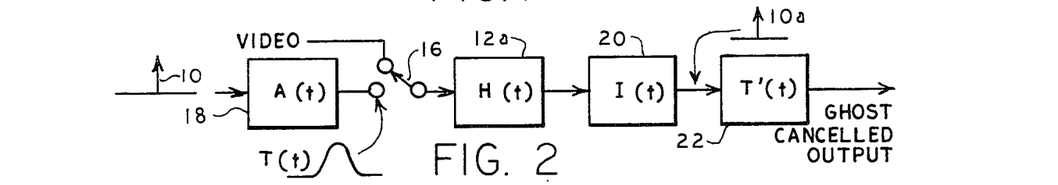
FIG. 2 is a block diagram of a communication system employing a channel equalizer according to the invention.

The use of a training pulse rather than an impulse response might be considered as implying that an inverse impulse response needs to be derived from the training signal response. However, this is not the case. A new communications channel can be redefined to include the effects of the bandwidth limited training pulse, and the channel's response to the training pulse can be taken as the impulse response of the new channel. FIG. 2 graphically illustrates the way in which a new channel response is defined herein and the manner in which the present channel equalizer is preferably employed.

In FIG. 2, a communications channel 12a has a response H(t) which, in the general case, includes minimum phase and maximum phase portions. The input to this channel is controlled by a switch 16 which, in its illustrated position, receives video information of the type included in a television broadcast signal. Of course, that input to the switch 16 is not limited to video data. Any other type of analog or binary data may be transmitted.

When the switch 16 is thrown to its other position, the channel 12a receives the output of a training signal generator 18. The input to the generator 18 may be the impulse 10, and the response A(t) of the generator 18 is such that a bandwidth limited training signal T(t) is developed at the output of the generator 18. In general, the signal T(t) includes minimum phase and maximum phase portions.

The signals received by the switch 16 are those which are transmitted to a channel equalizer via the communications channel 12a. In a television system, the channel 12a may be a cable or any other transmission medium which may induce ghosts into the transmitted signal. As used herein, the term ghosts means any type of linear distortion such as echos, smears and the like which are caused by imperfections in the communications channel. In the usual case, the ghosts experienced by the training signal are of the same type as the ghosts experienced by the video.

At the receiver, a channel equalizer 20 receives the transmitted signal. The response of this equalizer is selected to be the inverse of the minimum phase portion of H(t) convolved with the minimum phase portion of T(t). If H(t) and T(t) have no maximum phase components, then an impulse 10a is developed at the output of the equalizer 20 in response to the training pulse. However, what is desired is to recover the video and the training pulse (without ghosts). This is achieved by passing the output of the equalizer 20 through a network 22 whose response T'(t) is the minimum phase portion of T(t). The network 22 compensates for the effect of the generator 18 and the equalizer 20 to output the training pulse T(t) and the video.

If there are maximum phase components to H(t) and T(t), then the signal 10a will not be an impulse but a signal comprising both the maximum phase portions of H(t) and T(t) and the output of network 22 will be the training pulse T(t) and the video degraded only by the maximum phase portion of H(t). This approach is used herein for those cancellations, and a novel network is provided for the channel equalizer 20 to provide an inverse impulse response of the minimum phase portion of H(t) and T(t).

One concept which the invention relies on is that a finite length sequence of numbers adequately represents the channel impulse response H(t). Of course, a finite length sequence assumes zero valued samples beyond the point where the sequence is truncated. If the samples beyond the finite length are not zero valued, then truncation of the sequence to a finite length introduces error in the impulse response and, consequently, its inverse. The amount of error depends on the significance of the truncated samples. However, practical hardware limitations necessitate the use of a finite sequence to represent an impulse response and to develop an inverse impulse response. For purposes of channel equalization, it is believed that the use of a finite sequence is sufficiently accurate for most ghosting conditions.

The goal is, therefore, to invert a finite sequence of length $N+1$, where the finite sequence represents the input to the channel equalizer. Inverting the sequence gives the response I(t) identified in FIG. 2. Such a sequence can be represented by $h_n$ where $N=0, 1, \ldots, N$. The z-transform of this sequence is given by equation (1) below:

$$H(z) = h_0 + h_1 z^{-1} + h_2 z^{-2} + \ldots + h_N z^{-N} \quad \text{Eq. (1)}$$

Equation (1) can be rewritten as Equation (2):

$$H(z) = \frac{h_0(z - z_1)(z - z_2) \ldots (z - z_N)}{z^N} \quad \text{Eq. (2)}$$

In equation (2), the numerator corresponds to zeros of H(z) and the denominator corresponds to poles of H(z). Accordingly, it can be seen that the z-transform of a finite length sequence of length $N+1$ has N poles and N zeros, and the N poles are located at $z=0$. Further, if the $h_n$'s are real as in the case of sampling a time response, then any complex zeros occur in complex conjugate pairs.

The observations above reveal the following about inverting a finite sequence. Because the inverse is a sequence which, when convolved with the original sequence, gives a unity transfer function, and because the convolution of two sequences in the time domain corresponds to multiplication in the z-domain, then the inverse sequence to be developed by the channel equalizer has a z-transform as indicated by equation (3).

$$I(z) = \frac{z^N}{h_0(z - z_1)(z - z_2) \ldots (z - z_N)} \quad \text{Eq. (3)}$$

From Equation (3) it can be said that the inverse of a finite length sequence of length $N+1$ has N poles and N zeros, and the N zeros are located at $z=0$.

From Equations (2) and (3), those familiar with digital filters will recognize that H(z) is the equation for an FIR (finite impulse response) transversal filter, and I(z) is the equation of the same FIR filter when it is placed in a feedback configuration. This suggests that an FIR filter in a feedback configuration would theoretically produce the required I(z). However, such a configuration is practically impossible to implement so that it is unconditionally stable. For H(t)'s with maximum phase components, noise and component tolerances will prevent exact pole-zero cancellation and result in system oscillation.

To avoid these difficulties, the present invention recognizes that, if a finite length sequence $h_n$ is input to a part of a channel equalizer exhibiting a pair of controllable poles, and if the poles are made to fall on any pair of zeros of H(z), then the output sequence will be shortened by the two points, (i.e. the last two points of the sequence will become zero). That output sequence is then cascaded with another portion of the channel equalizer containing another pair of controllable poles. The latter poles cancel two more zeros and further shorten the sequence length by two points. This process is continued until all the zeros within the unit circle of the z-plane are cancelled. Zeros outside the unit circle which represent maximum phase components of H(t) are not cancelled because of stability considerations. The effect of the non-cancelled zeros outside the unit circle is not predictable, but if they produce a residual smear, the smear can be further filtered to give an overall linear phase response, an all-pass response, or any combination of those responses which is desirable. This further filtering may be achieved with a feedforward transversal filter or any other controllable filter.

Figure 3:
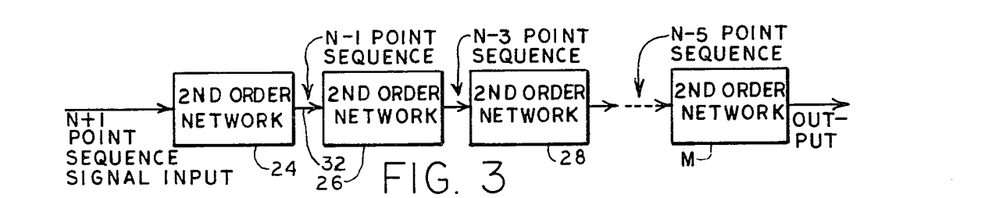
FIG. 3 shows a filter chain for implementing the channel equalizer of FIG. 2.

Referring to FIG. 3, a channel equalizer is shown for use in the communication system of FIG. 2. As shown, the equalizer includes a plurality of cascaded second order filter networks 24, 26, 28 . . . M. The number of networks which are used depends on ghosting conditions and the length of the finite sequence which represents the output of the communication channel.

The input to the first network 24 corresponds to the output of the communications channel 12a in FIG. 2. This is, the training signal and its ghosts and the video and its ghosts. It will be assumed that the training signal and its ghosts are received first and then the data and its ghosts are received. In practice, either may be received first, but the channel equalizer responds to the training signal and its ghosts for assuming a condition in which subsequently received data is filtered to remove ghosts therefrom.

As stated above, the training signal and its ghosts may be represented as a finite sequence of $N+1$ points or numbers. The network 24 senses the training signal and its ghosts for assuming a filter condition which reduces the finite sequence by two points at the filter's output 32. That is, if the input sequence is representable by the sequence $A_1, A_2 \ldots A_{10}, A_{11}$, where $A_1$ and $A_{11}$ are non-zero terms, then the output of the network 24 is representable by a sequence $B_1, B_2 \ldots B_8, B_9, 0, 0$, where $B_1$ and $B_9$ are non-zero numbers. Thus the $N+1$ term input sequence is filtered so that the last two terms are forced to zero to output a sequence whose length is $N-1$ terms long. Each successive filter network is adapted to receive and sense the output of an immediately preceding filter for assuming a filter condition in which an additional two terms at the end of the finite sequence are forced to zero. For the example above, the output of the filter network 26 can be represented by the sequence $D_1, D_2 \ldots D_6, D_7, 0, 0, 0, 0$. The filter network 28 outputs another sequence having two more zero terms at the end of the sequence. This process continues, with each filter network forcing two more numbers to zero until the output of network M has only non-zero terms in the sequence due to the maximum phase portion of the $N+1$ term input sequence of network 24. The result is a cascaded filter whose cumulative response compensates for the response of the communication channel so that all minimum phase ghosts are substantially removed from the training signal.

The filter networks hold their assumed conditions while the video signal is received and filtered so that the filter conditions set up in response to the training signal and its ghosts are applied to the video and its ghosts. Thus, if the video experiences ghosts of the same type that are experienced by the training signal, the minimum phase ghosts of the video signal are substantially removed.

In a television signal, multiple lines of video are received between each training signal. The filter networks apply the same filtering to each line of video which follows a training signal. When the next training signal is received, the filter networks assume a new filter condition if the response H(t) of the communication channel 12a changes. If no such change occurs, the filters remain in their previous conditions for filtering the following lines of video.

As stated above, the present channel equalizer does not cancel zeros outside the z-plane's unit circle. Stated another way, it does not account for the maximum phase portions of H(t) or T(t) (FIG. 2). Each of the filter networks independently eliminates two non-zero terms from its received sequence such that the filter chain's cumulative response is the inverse of the minimum phase portions of H(t) convolved with T(t).

To recover the video, the output of the filter M is applied to the network 22 of FIG. 2. In the case where the training signal is a 2T pulse, the network 22 may be a filter having a response corresponding to the minimum phase portion of a 2T pulse.

Referring again to FIG. 3, each of the filter networks is preferably a second order recursive filter which modifies its input in response to a pair of variable coefficients in a feedback network. In general, each of the filter networks may include a coefficient selector for sensing its network's output and for adjusting the values of the coefficients so that the last two numbers of its output sequence are normally forced to zero. As described in more detail below, the coefficients are not varied to force the last two numbers to zero if instability in a network would occur.

Figure 4:
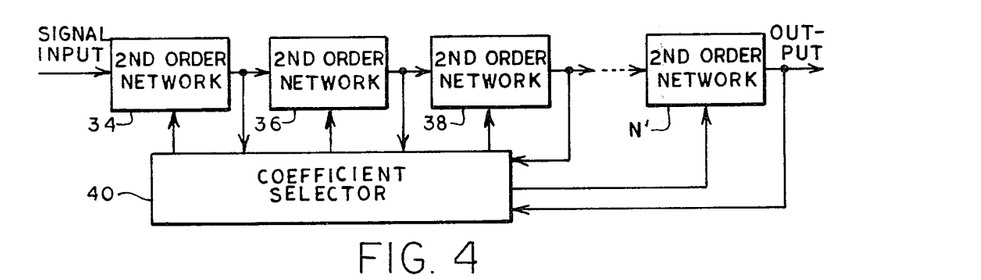
FIG. 4 shows another filter chain and a coefficient selector for implementing the channel equalizer of FIG. 2.

Another way of implementing the filter chain is shown in FIG. 4. In this embodiment, the filter chain includes second order filter networks 34, 36, 38 . . . N'. The latter networks are more simple than the ones shown in FIG. 3 in that a single coefficient selector 40 is used. It first selects the coefficients for the network 34, then for the network 36, etc.

Figure 5:
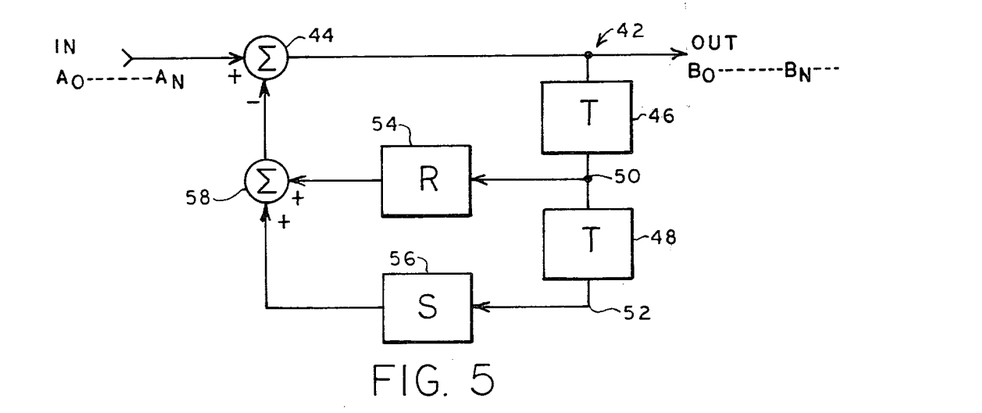
FIG. 5 shows more detail of each filter in the filter chain of FIG. 4.

Referring now to FIG. 5, a filter section 42 is shown. This illustrated filter section is a discrete time filter and is the preferred embodiment for each of the second order networks shown in FIG. 4. Included in this filter section is a summer 44, one input of which receives an input sequence designed $A_0 \ldots A_N$. In the case where the filter section 42 corresponds to the second order network 34 of FIG. 4, the input to the summer 44 constitutes the $N+1$ point sequence corresponding to the signal input to the filter chain.

The output of the summer 44 is coupled to a first delay device 46 for developing a first delayed output at the node 50. The amount of delay contributed by the delay device 46 (and all other delay devices in the filter chain) may be as long as possible while still fulfilling the Nyquist criteria. Each delay device should contribute the same amount of delay.

The delayed signal at the node 50 is coupled to the input of another delay device 48 for developing a second delayed output at a node 52. Weighting means 54 receives the signal on the node 50 for weighting the first delayed output by a variable coefficient R. Another weighting means 56 receives the signal on node 52 for weighting that signal by a variable coefficient S. In practice, each weighting means may vary its coefficients in response to an externally applied voltage.

A second summer 58 combines the weighted output of the devices 54 and 56 and inputs their combined outputs to a subtracting input of the summer 44. With this arrangement, the output of the network 42 can be represented as another sequence shown as $B_0 \ldots B_N \ldots$. It will be appreciated that at a given instant of time when the input to the network 34 is $A_N$, the output of the network 42 will be $B_N$ and the signal at the node 50 will correspond to $B_{N-1}$. The coefficients R and S are modified by the coefficient selector 40 to force to zero the two terms $B_N$ and $B_{N-1}$ of the output sequence.

Figure 6:
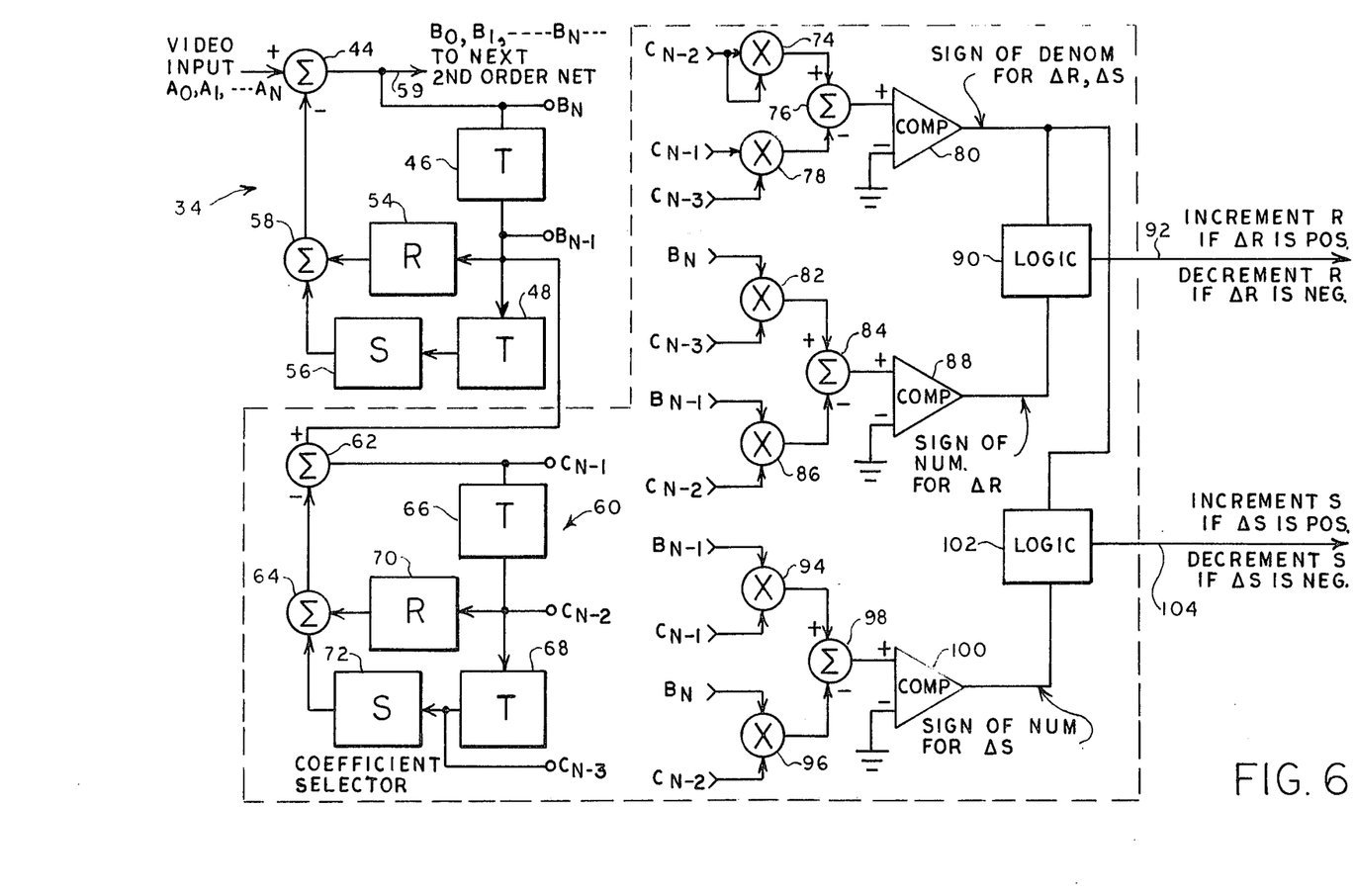
FIG. 6 shows details of the coefficient selector of FIG. 4 and the way it interfaces with one of the filters.

The way in which the network 42 interfaces with the coefficient selector 40 is shown in FIG. 6. In this figure, the summer 44 and the remaining components of the illustrated filter section constitute the second order network 34 of FIG. 4. Enclosed within the dashed box is a coefficient selector for sensing the output of the network 34 and for modifying the variable coefficients R and S.

The output of the network 34 (lead 59) is coupled to the input of the next successive second order network 36, as shown in FIG. 4. The output is also coupled to circuitry in the coefficient selector which is described later. At a selected instant in time, the output of the summer 44 can be represented as $B_N$. Consequently, the signal at the junction between the delay devices 46 and 48 can be described as $B_{N-1}$. The latter signal is applied to a network 60 inside the coefficient selector. The network 60 is contructed in the same manner as the second order network 34. To differentiate them, the network 60 is referred to herein as a coefficient filter.

Included in the coefficient filter 60 are a pair of summers 62 and 64, a pair of delay devices 66 and 68, and a pair of weighting means 70 and 72. The weighting means 70 and 72 weight their inputs by coefficients R and S which have the same value as the coefficients R and S in the network 34. To insure that the coefficients R and S in the network 60 track with the values of the corresponding coefficients in the network 34, the remainder of the coefficient selector varies the values of the coefficients R and S in the network 60 at the same time and in the same manner that it varies the coefficients R and S in the network 34.

As shown, the signal identified as $B_{N-1}$ in network 34 is coupled to one input of the summer 62 in network 60. The output of the summer 62 is identified as $C_{N-1}$. The signal at the junction between delay devices 66 and 68 is identified as $C_{N-2}$; and the signal at the output of the delay device 68 is identified as $C_{N-3}$. The way in which the outputs of the networks 34 and 60 are used to vary the coefficients R and S is described below.

Figures 7, 8, 9:
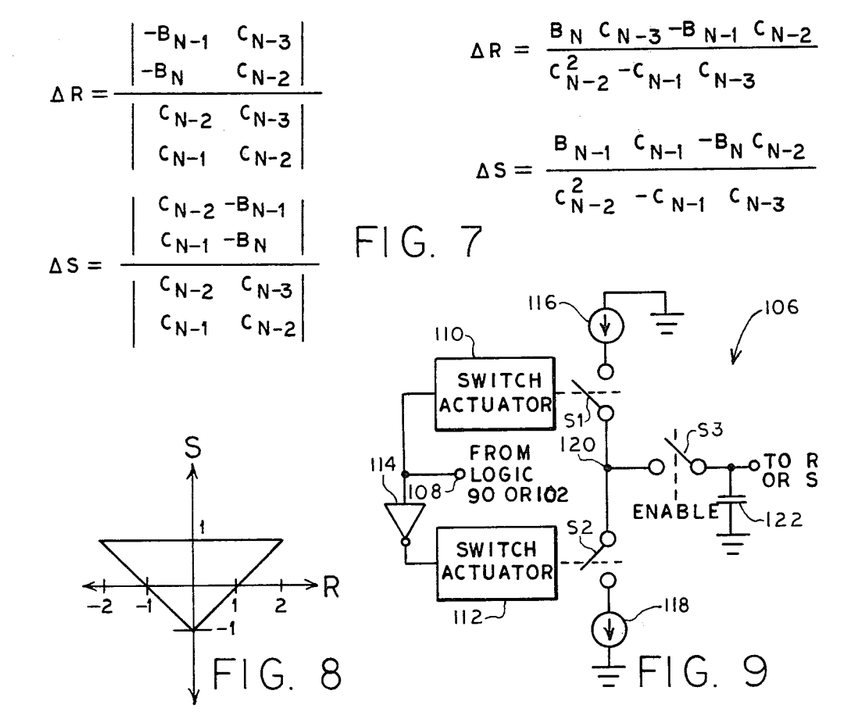
FIG. 7 depicts, in a mathematical form, the way in which the coefficient selector selects values for coefficients in the filter chain.
FIG. 8 is a diagram which shows the range of values which may be selected for the filter coefficients to maintain each filter in a stable state.
FIG. 9 shows a network useful in varying a coefficient value in response to the output of the coefficient selector of FIG. 6 and in response to an enabling signal.

Referring briefly to FIG. 7, a pair of determinants are shown for solving for incremental values of the coefficients R and S to cause the last two terms of an output sequence to be forced to zero. The equations for delta R and delta S illustrate how the determinants are solved. Initially, the coefficients R and S may be set to zero or any other suitable value. Then a value for delta S and delta R are determined according to the equations illustrated in FIG. 7. R and S are varied accordingly and the output sequences $B_n$ and $C_n$ change. The equations of FIG. 7 are repeated to find news values for incrementing or decrementing the coefficients R and S, and this process is continued in an iterative process until $B_N$ and $B_{N-1}$ are zero. At that time delta R and delta S will also be zero, and the filter network 34 will have cancelled a pair of zeros in the input sequence $A_0 \ldots A_N$. The sequence $C_n$ associated with the network 60 is used only for the calculation of delta R and delta S.

Referring again to FIG. 6, the coefficient selector includes a multiplier 74 which receives the signal $C_{N-2}$ from the network 60. The multiplier 74 operates to square this input signal and to apply it to the positive input of a summer 76. Another multiplier 78 receives the signal $C_{N-1}$ and $C_{N-3}$ from the network 60 for multiplying those two inputs together and applying its multiplied output to the negative input of the summer 76. Thus, the summer 76 develops an output which corresponds to the output of the multiplier 74. subtracted from the output of the multiplier 78. A conventional comparator 80 receives the output of the multiplier 76 to determine the sign of the signal at its positive input. The negative input of the comparator 80 is coupled to ground or any suitable reference voltage. With this arrangement, the output of the comparator 80 is indicative of the sign of the denominator for delta R as well as for delta S according to the equations of FIG. 7.

Another multiplier 82 receives the signal $B_N$ from the network 34 and the signal $C_{N-3}$ from the network 60. The multiplier 82 multiplies its two inputs and applies its output to the positive input of a summer 84. Another multiplier 86 receives the signal $B_{N-1}$ from the network 34 and the signal $C_{N-2}$ from the network 60. These multiplied inputs are coupled to the negative input of the summer 84 to be subtracted from its other input. A comparator 88 has its negative input terminal grounded and its positive input terminal coupled to the output of the summer 84. Thus, the output of the comparator 88 constitutes the sign of the numerator for delta R according to the equation of FIG. 7.

The outputs of comparators 80 and 88 are coupled to a logic network 90 for developing an output signal on lead 92 indicative of whether the coefficient R is to be incremented or decremented. If the inputs to the logic network 90 are either both positive or both negative, the network 90 outputs a positive signal to increment R. In all other conditions, the output of the network 90 indicates that R is to be decremented. This logic function may be implemented by a conventional exclusive OR gate.

Also included is another pair of multipliers 94 and 96 which feed a summer 98. The multiplier 94 receives the signal $B_{N-1}$ from the network 34 as well as the signal $C_{N-1}$ from the network 60. The multiplier 96 receives the signal $B_N$ from the network 34 and the signal $C_{N-2}$ from the network 60. The outputs of both these multipliers are coupled to the summer 98, and the output of the latter device is coupled to the positive input of a comparator 100. The negative input of the comparator 100 is grounded. Thus, the output of the comparator 100 constitutes the sign of the numerator for delta S, and it is applied to one input of the logic circuit 102.

If both inputs to the logic circuit 102 are positive or negative, this indicates that delta S is positive, wherefore the network 102 outputs a signal for incrementing the value of S. In all other conditions, the logic circuit 102 outputs a signal at lead 104 which causes the value of S to be decremented.

In the determination of the values of R and S, it is possible that the coefficient selector may try to cancel zeros outside the unit circle. This situation can be prevented on a stage-by-stage basis by constraining R and S to have the values which are shown within the triangle illustrated in FIG. 8. If the determination attempts to drive the values for R and S outside the illustrated triangle, the values for R and S may be reinitialized to a different set of initial values in order to find zeros inside the unit circle of the z-plane.

There are a number of ways to reinitialize the coefficients R and S. One way is to simply take half of S and the negative of R; another way is to increment S and take the negative of R. Still another way is to take values of R and S which correspond to values determined for a previous second order network.

Referring now to FIG. 9, a network 106 is shown for generating a voltage indicative of the value to which the coefficients R or S are to be set. In practice, there will be two such networks for each filter section, one for the coefficient R and another for the coefficient S. One such network will receive an input from the logic network 90 of FIG. 6 and the other will receive an input from the logic network 102 of FIG. 6. Assuming now that the network 106 is driven by the logic network 90, the output of the network 90 is coupled to an input terminal 108. Coupled to the terminal 108 is a conventional electronic switch actuator 110 which closes a switch S1 when the signal at terminal 108 is positive. Another switch actuator 112 is coupled to the terminal 108 via an inverter 114 for closing another switch S2 when the signal at terminal 108 is negative.

Network 106 also includes a pair of conventional current sources 116 and 118. When the switch S1 is closed, current from the source 116 is conducted to a node 120. When the switch S1 is opened and the switch S2 is closed, the source 118 conducts current away from the node 120.

Coupled to the node 120 is another switch S3 which is closed by an enable signal. The other side of the switch S3 is coupled to a grounded capacitor 122. Thus, when the switches S1 and S3 are closed, the capacitor 122 is charged by the current source 116. When the switches S2 and S3 are closed, the capacitor 122 is discharged by the source 118. Hence, the voltage to which the capacitor 122 is charged or discharged corresponds to the new value of the coefficient R (or S). That voltage is then coupled to the appropriate weighting means for varying the value of the coefficient. For example, the voltage stored on the capacitor 122 is applied to the weighting network 54 (FIG. 6) for varying R. It is also applied to the weighting means 70 of the coefficient filter 60. A network similar to the network 106 couples a voltage to the weighting means 56 of the filter network 34 and to the weighting means 72 of the coefficient filter 60 in order to vary the values of the coefficients S.

When the values of R and S in FIG. 6 have been selected so that the output sequence from the summer 44 includes two additional zero terms, the inputs and outputs of the coefficient selector are switched to the next filter in the chain to vary its coefficients R and S. For example, when R and S in the network 34 have been set for proper values, the network 60 is switched from the $B_{N-1}$ output of the filter network 34 to the corresponding output of the filter network 36 (FIG. 4). In addition, the inputs to the multipliers 82, 86, 94 and 96 are taken from the corresponding outputs of the filter network 36 rather than from the filter network 34. Thus, the coefficient selector steps from filter network to filter network to successively adjust the coefficients R and S of each filter network.

Figure 10:
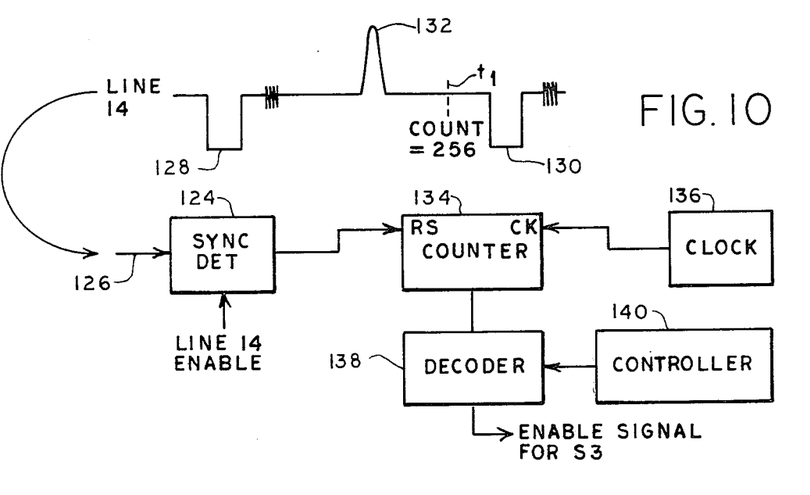
FIG. 10 illustrates a circuit for generating the enabling signal for the network of FIG. 9.

It will be recalled from FIG. 9 that the value of the coefficient R (or S) was incremented or decremented whenever the switch S3 was closed in response to an enable signal. FIG. 10 illustrates circuitry for generating such an enable signal.

The illustrated enable signal generator is for use in a channel equalizer for a television receiver. This generator includes a sync detector 124 which receives the television signal at its input lead 126. The illustrated portion of the television signal includes sync pulses 128 and 130, between which a training pulse 132 is included. This signal input corresponds to that which may be transmitted on a non-active television line such as 14 of each television field.

The detector 124 also receives an enabling pulse to activate it when line 14 occurs so that the sync pulse associated with line 14 can reset a counter 134. The clock input of counter 134 is derived from a clock generator 136, and the output of the counter 134 is coupled to a decoder 138. The period of the pulses output from the clock generator 136 is selected to be related to the delay associated with each of the delay devices in the filter chain.

To determine when the enable signal is generated, a conventional controller 140 may be coupled to the decoder 138 for selecting which counter state the decoder is responsive to. For example, the controller may cause the decoder 138 to output the enable signal when the counter attains a count of 256. Such a count may correspond to time $t_1$ in the video input to the sync detector 124.

Upon sensing a count of 256, the decoder outputs the enable signal for closing the switch S3 (FIG. 9) so that the coefficient R (or S) of the first filter network 34 is varied. To vary the coefficients in the second filter network, the controller 140 may cause the decoder 138 to respond to a different count, such as a count of 254. The coefficients for the remaining filter networks may be varied by successively reducing the counter state which the decoder is responsive to.

Figure 11:
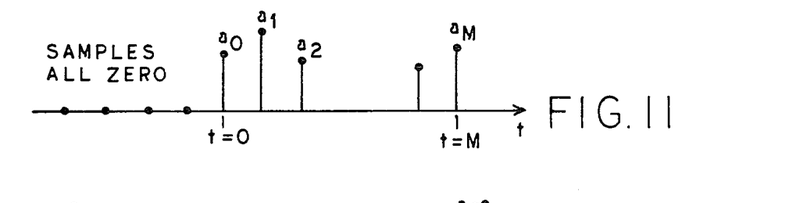
FIGS. 11 and 12 show the relative timing of input sequences applied to the channel equalizer.

It should be understood that, to cancel two points of a finite length sequence, $a_0, a_1 \ldots a_M$, the actual length of the sequence is unimportant. Each second order filter network is only concerned with the last two points of the sequence. Hence, the only timing information needed is the end point of the sequence. It is sufficient to know that the sequence is of finite length and that, prior to a time defined as $t=0$ when the first non-zero sample $a_0$ is taken, the sequence is zero. FIG. 11 illustrated the correspondence between $t=0$ and the sequence.

Note that the length M of the input sequence and the number of cascaded filter networks used for cancelling are independent. The cancelling begins at time M and proceeds to $M-2, M-4, M-6$, etc. until one of two situations occurs; either the number of cascaded filter networks is exhausted, or no more stable values of R and S can be found to cancel any more points. If the latter occurs, only the non-minimum phase portions of the original input sequence will remain.

Figure 12:
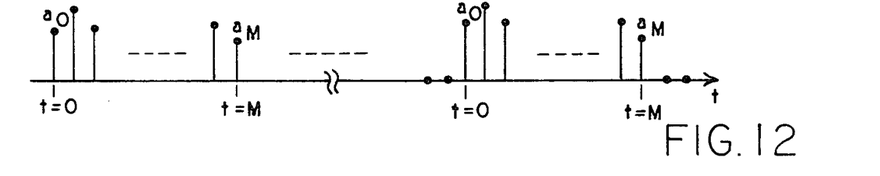

In a typical application such as television, the input sequence $a_0, a_1 \ldots a_M$ corresponds to a training signal and is repetitive. In addition, the time $t=0$ is defined at the same point in each repetition. In other words, the time $t=0$ is a locally defined point and exists for each repetition of the sequence $a_M$. FIG. 12 illustrates this concept.

Further, in an application such as television, the points prior to $a_0$ may not all be zero. For example, in the case of a training signal placed onto a line in the vertical interval, $a_0$ will usually be preceded by non-zero samples due to a sync pulse and ghosts of the sync pulse. However, if these non-zero samples are separated from $a_0$ by a sufficient number of zero samples, or they are sufficiently small in amplitude, their effect can be ignored. If their effect is not negligible, they may be suppressed from the input to the filter chain by substituting zero samples in their place.

When the present equalizer is used in a television receiver, 128 filter sections may be used. In other applications, the number of filter sections will depend on the nature of the ghosting conditions and the degree of ghost cancellation that is desired.

In some applications, an input sequence may be representable by an even number of terms. In that instance, the last filter section will reduce to zero only one term of the sequence. For example, if an input sequence is representable by 100 terms, and if 98 terms have been reduced to zero by a cascade of filter sections, the next filter is caused to reduce to zero only one of the remaining two terms. This may be achieved by causing the coefficient S of the last filter to be equal to zero and by permitting the coefficient R to be varied.

In the earlier discussion, a coefficient selector and associated circuitry were described for automatically varying the coefficients of each filter network. However, it may be sufficient for some applications that the coefficients of each filter section be manually selected, particularly where a receiver is to be situated at a known location where ghosting conditions do not change substantially.

Manual selection of the coefficients of the first filter network may be achieved as follows. An oscilloscope probe is placed at the output of the first filter network, and the oscilloscope's trace is synchronized with the repetition rate of the training signal. A pair of variable voltage sources are coupled to the weighting means so that the coefficients R and S may each be independently varied by adjusting the voltage sources. By observing the trailing portions of the signal which correspond to the last two points of the training signal and its ghosts, the voltage sources are varied until those trailing portions of the signal are reduced to zero. The same procedure may be followed for each filter network. If ghosting conditions do not change, further adjustment of coefficient values is unnecessary.

When using the present channel equalizer, two points of each filter network's output are forced to zero. As used herein, "forcing to zero" means forcing the last two points of a filter's output sequence to the D.C. level which corresponds to the level of the zero valued samples before and after the finite length sequence. In many cases, that D.C. level will actually be zero volts. However, if the input waveform to the filter chain is superimposed on a non-zero D.C. level, each filter network should force those two points to that D.C. level. A problem arises when the exact D.C. level corresponding to zero is not known. This might occur due to circuit tolerances or how a receiver responds to different ghosting conditions. In such instances, the exact D.C. level corresponding to zero can be established at the average D.C. level of the signal.

Figure 13:
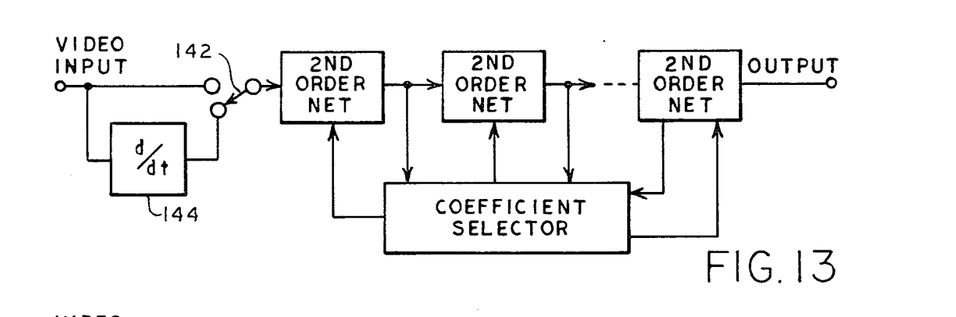
FIG. 13 shows the channel equalizer of FIG. 4 but with an input derivative network to compensate for non-zero D.C. levels of the equalizer's input signal.

This may be done by causing the input sequence to have a zero at the origin of the s-plane, as by differentiation of the signal input. This does not change the other zero locations of the input sequence, but simply adds a zero. Therefore, whatever values for the coefficients R and S are found to cancel two points of the derivative of the input sequence will still cancel two points of the original input sequence. FIG. 13 illustrates this concept.

As shown, a switch 142 couples the filter chain either to a derivative network 144 or to the video input. To set up the values for R and S in the filter chain, the switch 142 receives the video input's training signal and its ghosts through the derivative network 144. This forces the input to the filter chain to have an average level of zero. Then the switch 142 is thrown to the other position to receive unmodified video for removing ghosts therefrom.

Figure 14:
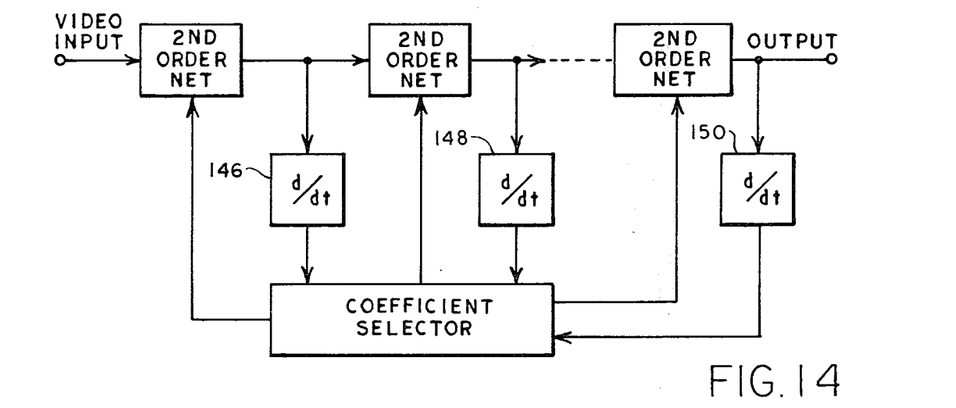
FIG. 14 illustrates another scheme for compensating for non-zero D.C. levels associated with the equalizer's input signal.

Another manner of compensating for non-zero D.C. level inputs is shown in FIG. 14. In this case, the video input (including the training signal) is applied directly to the filter chain. Derivative networks 146, 148 and 150 couple the outputs of each filter network to the coefficient selector. The results obtained are the same as those obtained by the circuitry of FIG. 13.

It has been stated that taking a derivative of the sequence adds a zero in the s-plane which corresponds to adding a zero in the z-plane. As seen from equation (2), this additional zero will cause the finite length sequence to be one point longer and should be handled as such. The coefficient selector should be made to work as described except for consideration of the extra point in the sequence after the derivative has been taken. As a result, an input sequence of length N should be treated as a sequence of length N+1 by the coefficient selector after the derivative has been taken.

The channel equalizer described herein may be used to advantage in a variety of communication systems. A television receiver is exemplary of but one such application.

One of the main advantages of this channel equalizer is that, by cascading individual filter sections, each having a response which is independently selected to be stable, stability of the over-all filter is unconditionally achieved. This is the prime advantage gained by selecting the response of each filter section on the basis of but two terms at a time. It also enables the filter sections to be manually or automatically adjusted on a stage-by-stage basis. Conventional feedback systems for reducing ghosts involve long transversal filters in a feedback path and have extremely complex stability criteria.

In construction, each individual component of the equalizer may be conventional. For example, the logic networks 90 and 102 may be constructed from 7486 type exclusive OR circuits; the comparators 80, 88 and 100 may be NE 529 devices made by Signetics; and the delay devices in each filter section may be MD 400Z01K devices manufactured by Allen Avionics which are suitable for use up to about one megahertz. For television applications, the delay devices should have a delay of about 100 nanoseconds. Of course, the delay devices may also be conventional delay lines.

Although the invention has been described in terms of preferred structure, it will be obvious to those skilled in the art that many modifications and alterations may be made without departing from the invention. Accordingly, all such modifications and alterations are intended to be included within the spirit and scope of the invention as defined by the appended claims.

What is claimed is:

1. In a system which receives, via a communication channel, a training signal, data and ghosts of the training signal and the data, and wherein the training signal and its ghosts are representable as a finite length sequence of N terms representative of the maximum and minimum phase components of the training signal, a channel equalizer for removing the ghosts of the data, comprising:

a chain of cascaded filters and means for controlling the filter condition of each of the filters, the first filter in the chain receiving the training signal and its ghosts and being caused by the means for controlling to assume a filter condition in which it outputs a signal representable by a finite length sequence of N−2 terms, each successive filter being adapted to receive and sense the output of an immediately preceeding filter and operated by the means for controlling for assuming a filter condition in which it outputs a signal representable by two fewer terms, thereby to provide a cascaded filter whose cumulative response compensates for the minimum phase components of the communication channel and the training signal so that the data and its ghosts may be applied to the chain of filters to substantially remove therefrom the same minimum phase components of the communication channel and the training signal.

2. A channel equalizer as set forth in claim 1 wherein each filter is a second order filter for modifying its input in response to a pair of variable coefficients, and wherein the means for controlling comprises a coefficient selector for sensing the output of each filter and for adjusting the values of the coefficients so that a sequence is output by each filter in which the last two terms are normally reduced to zero.

3. A channel equalizer as set forth in claim 2 wherein the coefficient selector iteratively varies the coefficient values until the last two terms of a filter's finite sequence output are reduced to zero.

4. A channel equalizer as set forth in claim 2 wherein the training signal and the data are superimposed on an unknown D.C. level, and further including means for inserting a zero at the origin of the s-plane associated with the training signal and its ghosts to develop a modified training signal and ghosts for input to the first filter in the chain.

5. A channel equalizer as set forth in claim 4 wherein said zero inserting means includes a derivative network coupled to the input of the first filter.

6. A channel equalizer as set forth in claim 2 wherein each filter is a recursive filter whose input is representable by a sequence $A_0, A_1 \ldots A_N$ and whose output is representable by a sequence $B_0, B_1 \ldots B_N, \ldots$ and wherein the coefficient selector includes a coefficient filter, similar to each of the recursive filters in the chain of filters, for sensing the output of one filter at a time, said coefficient filter including a pair of variable coefficients which match the coefficients of a sensed filter for developing an output sequence $C_0, C_1 \ldots C_N \ldots$ and wherein the coefficient generator includes control means receiving at least a portion of the sequences $B_0, B_1 \ldots B_N \ldots$ and $C_0, C_1 \ldots C_N \ldots$ to increment and decrement the coefficients of the sensed filter and the coefficient filter until $B_N$ and $B_{N-1}$ equal zero.

7. A channel equalizer as set forth in claim 6 wherein each filter in the chain of filters develops a sequence output represented by $B_N$ at a given instant in time and includes means for simultaneously developing an output $B_{N-1}$, wherein said coefficient filter receives the $B_{N-1}$ output of a sensed filter for developing simultaneous outputs represented by $C_{N-1}$, $C_{N-2}$ and $C_{N-3}$, and wherein said control means is responsive to the $B_N$, $B_{N-1}$, $C_{N-1}$, $C_{N-2}$ and $C_{N-3}$ outputs for varying the coefficients of the sensed filter and the coefficient filter until $B_N$ and $B_{N-1}$ equal zero.

8. A channel equalizer as set forth in claim 7 wherein each filter in the chain of filters includes:
a first summer having a first input receiving a signal representable by the sequence $A_0, A_1 \ldots A_N$, a second input and an output;
a first delay device receiving the output of the first summer to develop a first delayed output;
a second delay device receiving the output of the first delay device for developing a second delayed output;
weighting means coupled to the output of the first delay device for weighting the first delayed output by a variable coefficient R;
weighting means coupled to the output of the second delay device for weighting the second delayed output by a variable coefficient S; and
a second summer for combining the weighted outputs of both weighting means and for inputting the combined outputs to the second input of the first summer, whereby at a given instant in time, the output of the first summer corresponds to $B_N$ and the output of said first delay device corresponds to $B_{N-1}$.

9. A channel equalizer as set forth in claim 8 wherein the coefficient filter includes first and second summers, first and second delay devices, and a pair of weighting means as set forth for each of the filters in the chain of filters for modifying its input to develop an output sequence which, at a given instant in time, is represented by $C_{N-1}$ at the output of the coefficient filter's first summer, by $C_{N-2}$ at the output of the coefficient filter's first delay device, and by $C_{N-3}$ at the output of the coefficient filter's second delay device.

10. A channel equalizer as set forth in claim 7 wherein said control means includes:
means for squaring the signal $C_{N-2}$ to provide a squared signal;
means for multiplying the signal $C_{N-1}$ times the signal $C_{N-3}$ to provide a multiplied signal;
means for subtracting the multiplied signal from the squared signal to provide a first remainder signal;
means for determining the sign of the first remainder signal;
means for multiplying the signal $B_N$ times the signal $C_{N-3}$ to provide a second multiplied signal;
means for multiplying the signal $B_{N-1}$ times the signal $C_{N-2}$ to develop a third multiplied signal;
means for subtracting the third multiplied signal from the second multiplied signal to provide a second remainder signal;
means for determining the sign of the second remainder signal;
means for multiplying the signal $B_{N-1}$ times the signal $C_{N-1}$ to provide a fourth multiplied signal;
means for multiplying the signal $B_N$ times the signal $C_{N-2}$ to provide a fifth multiplied signal;
means for subtracting the fifth multiplied signal from the fourth multiplied signal to provide a third remainder signal;
means for determining the sign of the third remainder signal;
means responsive to the sign of the first and second remainder signals for varying one of the coefficients in a sensed filter; and
means responsive to the sign of the first and third remainder signals for varying the other coefficient in the sensed filter.

11. In a communications system wherein an information signal is sent from a transmitter to a receiver via a communications channel having a responsive H(t) which includes minimum and maximum phase portions, wherein the information signal includes a training signal and data which experience ghosts as a result of the response H(t), wherein the training signal is representative of an impulse modified by transmitter-based processing circuitry having a response A(t) which also includes minimum and maximum phase portions, a receiver-based channel equalizer for removing ghosts experienced by the data, comprising:
a filter chain receiving the transmitted training signal and its ghosts and the data and its ghosts, the filter chain including a plurality of cascaded, second order recursive filters, the first of which assumes and remains in a filter condition dependent on the training signal and its ghosts for outputting a modified signal, each successive filter assuming and remaining in a filter condition for outputting a modified signal dependent on the modified output of an immediately preceding filter so that when the data and its ghosts are received by the filter chain, each filter therein filters the data and its ghost according to its assumed condition, the assumed condition of each of said filters being such that the chain's cumulative response is the inverse of the result of convolving the minimum phase portion of H(t) with the minimum phase portion of A(t); and means for modifying the output of the filter chain by the minimum phase portion of response A(t) so that the training signal and data are recovered.

12. In a system which receives, via a communication channel, a training signal, data, and ghosts of the training signal and the data, and wherein the training signal and its ghosts are representable as a finite length sequence of N terms representative of the maximum and minimum phase components of the communication channel and the training signal, a method of removing the ghosts from the data, comprising:

processing the training signal and its ghosts by performing a plurality of first successive filtering steps each of which reduces the number of terms of the finite length sequence by two; and processing the data and its ghosts by performing a plurality of successive second filtering steps each of which has a characteristic substantially identical to a corresponding one of the first filtering steps.

13. A method as set forth in claim 12 wherein each of the first filtering steps comprises iteratively varying a pair of coefficients defining a filter characteristic until a sequence is produced in which the last two terms are normally reduced to zero.

* * * * *